US012608566B2

(12) United States Patent
Zhang et al.

(10) Patent No.: US 12,608,566 B2
(45) Date of Patent: Apr. 21, 2026

(54) METHOD AND APPARATUS FOR SELECTING SAMPLE CORPUS USED TO OPTIMIZE TRANSLATION MODEL

(71) Applicant: Beijing Baidu Netcom Science Technology Co., Ltd., Beijing (CN)

(72) Inventors: Ruiqing Zhang, Beijing (CN); Xiyang Wang, Beijing (CN); Zhongjun He, Beijing (CN); Zhi Li, Beijing (CN); Hua Wu, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 634 days.

(21) Appl. No.: 18/089,392

(22) Filed: Dec. 27, 2022

(65) Prior Publication Data

US 2023/0140997 A1 May 11, 2023

(30) Foreign Application Priority Data

May 12, 2022 (CN) .......................... 202210517309.2

(51) Int. Cl.
*G06F 40/58* (2020.01)

(52) U.S. Cl.
CPC .................................... *G06F 40/58* (2020.01)

(58) Field of Classification Search
CPC .......... G06F 40/44; G06F 40/51; G06F 40/58
See application file for complete search history.

(56) References Cited

U.S. PATENT DOCUMENTS

| | | | |
|---|---|---|---|
| 2009/0012776 A1 | 1/2009 | Chino et al. | |
| 2014/0350913 A1 | 11/2014 | Cheng et al. | |
| 2018/0004730 A1 | 1/2018 | Qiu et al. | |
| 2019/0251174 A1* | 8/2019 | Lee ......................... | G06F 40/51 |

(Continued)

FOREIGN PATENT DOCUMENTS

| | | |
|---|---|---|
| CN | 109960800 A | 7/2019 |
| CN | 110263350 A | 9/2019 |

(Continued)

OTHER PUBLICATIONS

Chinese Office Action for Application No. 202210517309.2, dated Oct. 11, 2022, in 8 pages.

(Continued)

*Primary Examiner* — Angela A Armstrong
(74) *Attorney, Agent, or Firm* — Knobbe, Martens, Olson & Bear, LLP

(57) ABSTRACT

A method and apparatus for selecting a sample corpus used to optimize a translation model, an electronic device, a computer readable storage medium, and a computer program product are provided. The method includes: after acquiring a first corpus, translating the first corpus by using a to-be-optimized translation model to acquire a second corpus with different types of languages, then translating the second corpus by using the to-be-optimized translation model to acquire a third corpus, then determining a difficulty level of the first corpus based on a similarity between the first corpus and the third corpus, and finally determining the first corpus as a sample corpus used to perform optimization training on the to-be-optimized translation model in response to the difficulty level satisfying requirements of a difficulty level threshold.

15 Claims, 4 Drawing Sheets

(56)     References Cited

U.S. PATENT DOCUMENTS

2020/0026763 A1     1/2020  Kurabayashi
2021/0174019 A1*   6/2021  Jiang ..................... G06F 40/263

FOREIGN PATENT DOCUMENTS

| | | | |
|---|---|---|---|
| CN | 110807332 | A | 2/2020 |
| CN | 110941966 | A | 3/2020 |
| CN | 111144142 | A | 5/2020 |
| CN | 111859997 | A | 10/2020 |
| CN | 112270200 | A | 1/2021 |
| CN | 112395876 | A | 2/2021 |
| CN | 112633017 | A | 4/2021 |
| CN | 113408302 | A | 9/2021 |
| JP | 2018181181 | A | 11/2018 |
| WO | 2022055244 | A1 | 3/2022 |

OTHER PUBLICATIONS

Guo, Mandy et al., "Effective Parallel Corpus Mining using Bilingual Sentence Embeddings," Google AI Maountain View, CA, USA, Carnegie Mellon University Pittsburgh, PA, USA, Aug. 2, 2018, in 11 pages. Hebei University of Dec. 2019, in 5 pages.
Li, Sha et al., "Computer Aided Translation Model Simulation Based on Bilingual E—Chunk," Science and Technology, China, 1006-9348 (2019)12-0345-04, Dec. 2019, in 5 pages.

* cited by examiner

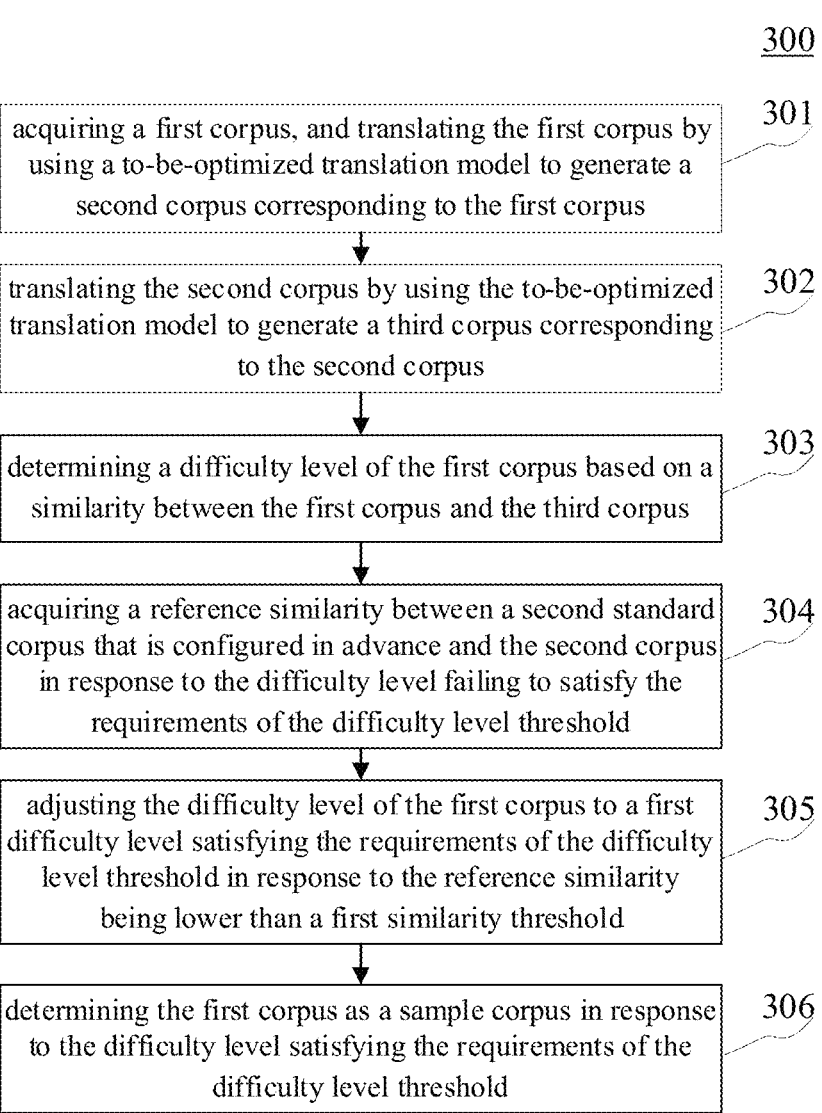

300

301
acquiring a first corpus, and translating the first corpus by using a to-be-optimized translation model to generate a second corpus corresponding to the first corpus 302
translating the second corpus by using the to-be-optimized translation model to generate a third corpus corresponding to the second corpus 303
determining a difficulty level of the first corpus based on a similarity between the first corpus and the third corpus 304
acquiring a reference similarity between a second standard corpus that is configured in advance and the second corpus in response to the difficulty level failing to satisfy the requirements of the difficulty level threshold 305
adjusting the difficulty level of the first corpus to a first difficulty level satisfying the requirements of the difficulty level threshold in response to the reference similarity being lower than a first similarity threshold 306
determining the first corpus as a sample corpus in response to the difficulty level satisfying the requirements of the difficulty level threshold

Fig. 3

METHOD AND APPARATUS FOR SELECTING SAMPLE CORPUS USED TO OPTIMIZE TRANSLATION MODEL

CROSS-REFERENCE TO RELATED APPLICATIONS

The present application claims the priority of Chinese Patent Application No. 202210517309.2, titled "METHOD AND APPARATUS FOR SELECTING SAMPLE CORPUS USED TO OPTIMIZE TRANSLATION MODEL", filed on May 12, 2022, the disclosure of which is incorporated herein by reference in its entirety.

TECHNICAL FIELD

The present disclosure relates to the field of computer technology, in particular, to the field of artificial intelligence such as natural language processing, machine translation, and deep learning, and more particularly, to a method and apparatus for selecting a sample corpus used to optimize a translation model, an electronic device, a computer readable storage medium, and a computer program product.

BACKGROUND

In a training scenario of a machine translation model, for a large amount of training data, existing technologies have proposed a learning method using a course schedule, that is, training the model in a step-by-step manner by learning a sample with a low difficulty in priority and learning a sample with a high difficulty in subsequent learning, so as to improve a training effect of the machine translation model.

In particular, when the machine translation model is trained to a certain stage, the machine translation model has excellent processing ability for simple samples, and the simple samples have very limited effect on the training process of the machine translation model. To further improve a quality of the machine translation model, it is necessary to gradually increase difficulty of training samples and train the machine translation model by using complex samples with high difficulty.

SUMMARY

Embodiments of the present disclosure provide a method and apparatus for selecting a sample corpus used to optimize a translation model, an electronic device, a computer readable storage medium, and a computer program product.

Some embodiments of the present disclosure provide a method for selecting a sample corpus used to optimize a translation model, including: acquiring a first corpus, and translating the first corpus by using a to-be-optimized translation model to generate a second corpus corresponding to the first corpus, wherein a language type of the first corpus and a language type of the second corpus are different, and the to-be-optimized translation model are configured to perform bidirectional translation between the language type of the first corpus and the language type of the second corpus; translating the second corpus by using the to-be-optimized translation model to generate a third corpus corresponding to the second corpus, wherein a language type of the third corpus and the language type of the first corpus are the same; determining a difficulty level of the first corpus based on a similarity between the first corpus and the third corpus, wherein the difficulty level comprises at least two levels; and determining the first corpus as a sample corpus in response to the difficulty level satisfying requirements of a difficulty level threshold, wherein the sample corpus is configured to optimize the to-be-optimized translation model.

Some embodiments of the present disclosure provide an apparatus for selecting a sample corpus used to optimize a translation model, including: a second-corpus generating unit configured to acquire a first corpus, and translate the first corpus by using a to-be-optimized translation model to generate a second corpus corresponding to the first corpus, wherein a language type of the first corpus and a language type of the second corpus are different, and the to-be-optimized translation model are configured to perform bidirectional translation between the language type of the first corpus and the language type of the second corpus; a third-corpus generating unit configured to translate the second corpus by using the to-be-optimized translation model to generate a third corpus corresponding to the second corpus, wherein a language type of the third corpus and the language type of the first corpus are the same; a difficulty level determining unit configured to determine a difficulty level of the first corpus based on a similarity between the first corpus and the third corpus, wherein the difficulty level comprises at least two levels; and a sample corpus selecting unit configured to determine the first corpus as a sample corpus in response to the difficulty level satisfying requirements of a difficulty level threshold, wherein the sample corpus is configured to optimize the to-be-optimized translation model.

Some embodiments of the present disclosure provide an electronic device including one or more processors; and a storage device in communication with one or more processor, wherein the storage device stores instructions executable by the one or more processor, to enable the one or more processor to perform the method for selecting a sample corpus used to optimize a translation model as described in any of implementations of the above method.

Some embodiments of the present disclosure provide a non-transitory computer readable storage medium, storing a computer instruction, wherein the computer instruction when executed by a computer causes the computer to perform the method for selecting a sample corpus used to optimize a translation model as described in any of the implementations of the above method.

Some embodiments of the present disclosure provide computer program product comprising a computer program, wherein the computer program, when executed by a processor, causes the processor to perform the method for selecting a sample corpus used to optimize a translation model as described in any of the implementations of the first aspect.

It should be understood that the content described in this section is not intended to identify key or important features of the embodiments of the present disclosure, nor is it intended to limit the scope of the present disclosure. Other features of the present disclosure will become readily understood from the following specification.

BRIEF DESCRIPTION OF THE DRAWINGS

Other features, objectives and advantages of the present disclosure will become more apparent upon reading the detailed description of non-limiting embodiment with reference to the following accompanying drawings.

FIG. 3 is a flowchart of another method for selecting a sample corpus used to optimize a translation model according to an embodiment of the present disclosure;

DETAILED DESCRIPTION OF EMBODIMENTS

Example embodiments of the present disclosure are described below with reference to the accompanying drawings, where various details of the embodiments of the present disclosure are included to facilitate understanding, and should be considered merely as examples. Therefore, those of ordinary skills in the art should realize that various changes and modifications can be made to the embodiments described herein without departing from the scope and spirit of the present disclosure. Similarly, for clearness and conciseness, descriptions of well-known functions and structures are omitted in the following description.

It should be noted that the embodiments of the present disclosure and features of the embodiments may be combined with each other on a non-conflict basis.

Figure 1:
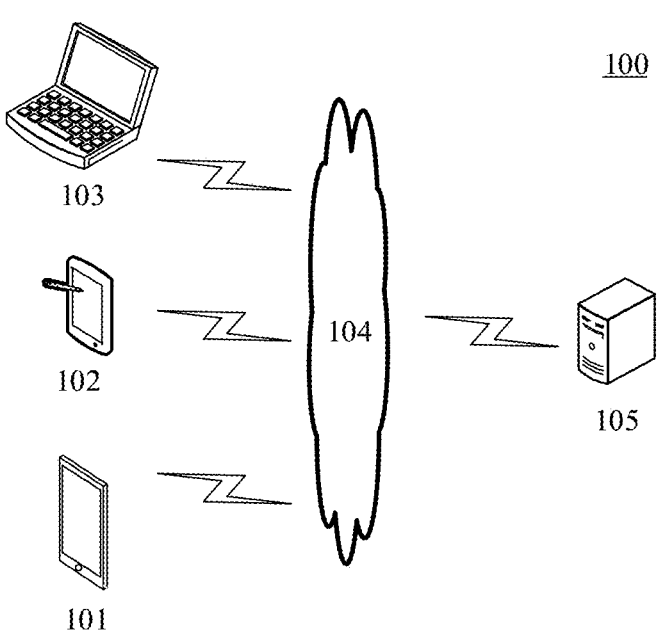
FIG. 1 is an exemplary system architecture in which the present disclosure may be applied.

FIG. 1 illustrates an exemplary system architecture 100 in which a method and an apparatus for selecting a sample corpus used to optimize a translation model, an electronic device, a computer readable storage medium or a computer program product according to an embodiment of the present disclosure may be applied.

As shown in FIG. 1, the system architecture 100 may include terminal devices 101, 102, and 103, a network 104, and a server 105. The network 104 serves as a medium providing a communication link between the terminal devices 101, 102, 103, and the server 105. The network 104 may include various types of connections, such as wired or wireless communication links, or optical cables.

A user may use the terminal devices 101, 102, 103 to interact with the server 105 via the network 104 to receive or send messages, or the like. Various applications for implementing information communication between the terminal devices 101, 102, 103 and the server 105 may be installed, such as model optimization and training applications, sample selecting applications, or instant messaging applications.

The terminal devices 101, 102, and 103 and the server 105 may be hardware or software. When the terminal devices 101, 102, and 103 are hardware, they may be various electronic devices having display screens, including but not limited to smart phones, tablet computers, laptop computers, desktop computers, or the like; when the terminal devices 101, 102, and 103 are software, they may be installed in the above listed electronic devices. The terminal devices 101, 102, and 103 may be implemented as a plurality of software or software modules, or may be implemented as a single software or software module, which is not limited herein.

When the server 105 is hardware, it may be implemented as a distributed server cluster composed of a plurality of servers, or may be implemented as a single server; when the server 105 is software, it may be implemented as a plurality of software or software modules, or may be implemented as a single software or software module, which is not limited herein.

The server 105 can provide various services through various built-in applications, for example, a remote training application that can provide remote model training. When the server 105 runs a model optimization and training application, the server 105 can first acquire a first corpus from the terminal devices 101, 102 and 103 through the network 104, and locally translate the first corpus using a to-be-optimized translation model to generate a second corpus corresponding to the first corpus, wherein the first corpus and the second corpus are of different languages. The server 105 then translates the second corpus by using the to-be-optimized translation model to generate a third corpus corresponding to the second corpus; next, the server 105 determines a difficulty level of the first corpus based on a similarity between the first corpus and the third corpus, wherein the difficulty level includes at least two levels; and finally, the server 105, in response to that the difficulty level satisfies requirements of a difficulty level threshold, determines the first corpus as a sample corpus used to optimize the to-be-optimized translation model.

It should be noted that the first corpus may be acquired from the terminal devices 101, 102, 103 through the network 104, or may be pre-stored locally on the server 105 in various manners. Thus, when the server 105 detects that the data has been stored locally (e.g., a remaining optimization task for optimizing the to-be-optimized translation model before initiating the processing), the server 105 may optionally acquire the data directly from the local, in which case the exemplary system architecture 100 may also not include the terminal devices 101, 102, 103 and the network 104.

Since optimization of the to-be-optimized translation model requires more computational resources and stronger computational capabilities, the method for selecting the sample corpus used to optimize the translation model provided in subsequent embodiments of the present disclosure is generally performed by the server 105 having stronger computational capabilities and more computational resources, and accordingly, the apparatus for selecting the sample corpus used to optimize the translation model is also generally provided in the server 105. However, it should be noted that when the terminal devices 101, 102, and 103 also have the operation capabilities and the operation resources that satisfy the requirements, the terminal devices 101, 102, and 103 may perform the above-mentioned operations performed by the server 105 through the model optimization and training application installed on the terminal devices 101, 102, and 103, and further output the same results as those of the server 105. In particular, when a plurality of terminal devices having different operation capabilities exist at the same time, but the model optimization and training application determines that the terminal device in which the model optimization training application is located has a relatively strong operation capability and a relatively large amount of residual operation resources, the terminal device may be enabled to execute the above operation, so that an operation pressure of the server 105 is appropriately reduced. Accordingly, the apparatus for selecting the sample corpus used to optimize the translation model may be provided in the terminal devices 101, 102, and 103. In this case, the exemplary system architecture 100 may also not include the server 105 and the network 104.

It should be understood that the number of terminal devices, networks and servers in FIG. 1 is merely illustrative. There may be any number of terminal devices, networks, and servers according to actual needs.

Figure 2:
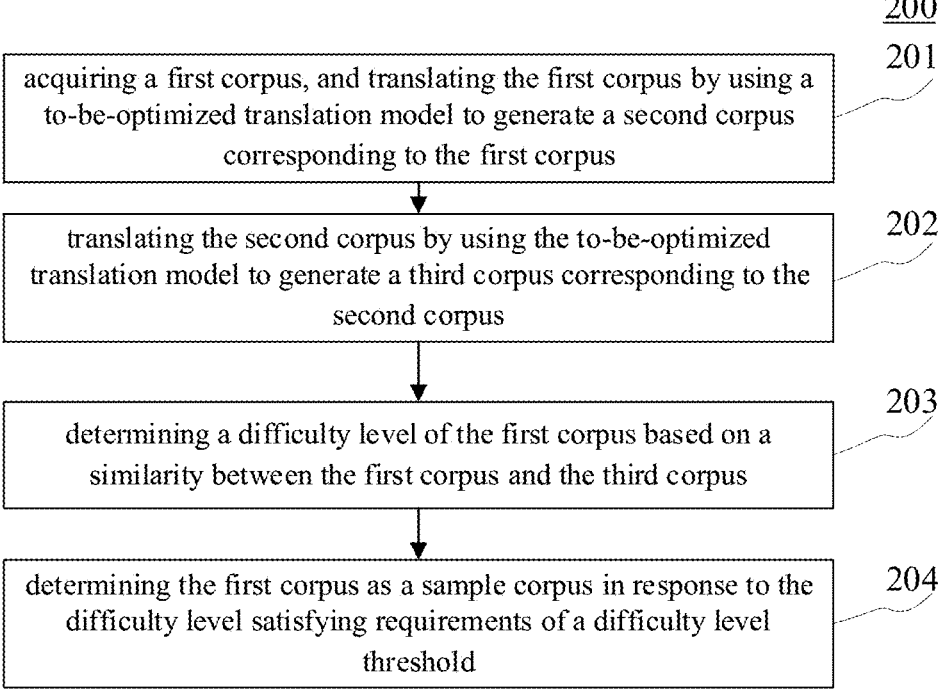
FIG. 2 is a flowchart of a method for selecting a sample corpus used to optimize a translation model according to an embodiment of the present disclosure.

Referring to FIG. 2, FIG. 2 illustrates a flowchart of a method for selecting a sample corpus used to optimize a translation model according to an embodiment of the present disclosure. The flowchart 200 includes the following steps.

Step 201: acquiring a first corpus, and translating the first corpus by using a to-be-optimized translation model to generate a second corpus corresponding to the first corpus.

In the present embodiment, after the first corpus is acquired by the execution body of the method for selecting a sample corpus used to optimize a translation model (for example, the server 105 shown in FIG. 1), the first corpus is processed and translated by using the to-be-optimized translation model to obtain a second corpus of other language types corresponding to the first corpus, where a language type of the first corpus and a language type of the second corpus are different, and the to-be-optimized translation model may be used to perform bidirectional translation between the language types of the first corpus and the language types of the second corpus, and the language types of the first corpus and the second corpus generally correspond to the language types supported by the to-be-optimized translation model. For example, when the to-be-optimized translation model is a bilingual translation model in which a user performs Chinese-English and English-Chinese translation, a language type of the first corpus may be Chinese, and a language type of the second corpus may be English accordingly.

Here, the to-be-optimized translation model is a translation model, a translation editor, a translation tool, and the like that can be used to convert and translate between different language types in the existing technologies, including but not limited to a translation model for translating text between different languages, and a translation model for converting speech content in one language into speech content and/or text content in another language.

In practice, a corresponding second standard corpus is generally configured for the first corpus in advance, and the second standard corpus is generally acquired while the first corpus is acquired. The second standard corpus is in the same language type as the second corpus, and the content of the second standard corpus is a predetermined standard translation content corresponding to the first corpus under the language type of the second corpus. Subsequently, when the first corpus is determined as a sample corpus, the first corpus and the second standard corpus may be respectively used as input and output of the to-be-optimized translation model for training the to-be-optimized translation model.

It should be noted that the first corpus may be directly acquired by the above-mentioned execution body from a local storage device, or may be acquired from a non-local storage device (such as the terminal devices 101, 102, 103 shown in FIG. 1). The local storage device may be a data storage module, such as a server hard disk, disposed within the execution body, in which case the first corpus can be quickly read locally. The non-local storage device may also be any other electronic device provided for storing data, such as some user terminals or the like. In this case, the above-mentioned execution body may acquire the first corpus by transmitting an acquisition command to the electronic device.

Step 202: translating the second corpus by using the to-be-optimized translation model to generate a third corpus corresponding to the second corpus.

In the present embodiment, after acquiring the second corpus corresponding to the content of the first corpus and having a different language type based on the above-mentioned step 201, the second corpus is further processed by using the to-be-optimized translation model to obtain the third corpus corresponding to the second corpus, where a language type of the third corpus and the language type of the first corpus are the same.

In practice, the first corpus may be a corpus set of a plurality of contents. For example, the first corpus may be a corpus set based on "I want to eat an apple." "I love apples." "Apples are helpful to your health." In this process, the corresponding second corpus of each content included in the first corpus can be determined respectively. A corresponding difficulty level of each corpus may be acquired in a similar way as stated above, and the corresponding difficulty level of the first corpus can be determined by weighting or other methods.

Step 203: determining a difficulty level of the first corpus based on a similarity between the first corpus and the third corpus.

In the present embodiment, the third corpus generated in the above-mentioned step 202 is acquired, the similarity between the first corpus and the third corpus is generated, and the difficulty level of the first corpus is determined based on the similarity, where the difficulty level may be at least two preset levels. After at least two difficulty levels are configured in advance, a condition of similarity may be determined for each difficulty level. For example, in a scene with two difficulty levels of "easy" and "difficult", when the similarity between the first corpus and the third corpus is less than 50%, the difficulty level of the first corpus is determined as "difficult"; when the similarity between the first corpus and the third corpus is greater than 50%, the difficulty level of the first corpus is determined as "easy".

Preferably, the similarity between the first corpus and the third corpus may be acquired by comparing a matching degree of the contents recorded at corresponding positions of the first corpus and the third corpus, so as to improve an efficiency of determining the similarity between the first corpus and the third corpus. The similarity between the first corpus and the third corpus may also be represented by a cosine similarity between corpus features and corpus vectors respectively corresponding to the first corpus and the third corpus and generated based on the first corpus and the third corpus.

In practice, a plurality of difficulty levels may be configured according to actual optimization requirements, e.g., the difficulty levels of "Level I", "Level II", "Level III" and "Level IV" are respectively determined from low to high, so that the training difficulty of training the to-be-optimized translation model by using the first corpus may be graded in a more detailed manner.

Step 204: determining the first corpus as a sample corpus in response to the difficulty level satisfying requirements of a difficulty level threshold.

In the present embodiment, when the difficulty level of the first corpus determined in the above step 203 satisfies the requirements of the pre-configured difficulty level threshold, the first corpus is determined as the sample corpus used to optimize the to-be-optimized translation model.

Further, after it is determined that the first corpus is the sample corpus, if there is no corresponding second standard corpus for the first corpus, the first corpus may be fed back, so that a trainer of the to-be-optimized translation model adds the corresponding second standard corpus for the sample corpus, and then optimizes and trains the to-be-optimized translation model by using the sample corpus and the second standard corpus as input and input.

An identification and processing ability of the to-be-optimized translation model for the first corpus may be determined through a bidirectional processing result of the to-be-optimized translation model for the first corpus, so that after the processing difficulty of the first corpus for the to-be-optimized translation model is determined, a sample corpus with an actual optimization effect on the current model effect is selected, and a problem of misjudging a difficulty level of a sample corpus caused by error-tagging in the first corpus may be solved.

In some alternative implementations of the present embodiment, the determining the difficulty level of the first corpus based on the similarity between the first corpus and the third corpus includes: acquiring the similarity between the first corpus and the third corpus; and determining the difficulty level of the first corpus according to a threshold interval in which the similarity falls.

Specifically, after at least two difficulty levels are configured in advance, a threshold intervals of a similarity corresponding to each difficulty level is respectively configured, so that after the similarity between the first corpus and the third corpus is acquired, the corresponding difficulty level is determined based on the threshold interval in which the similarity falls, and the difficulty level of the first corpus is quickly and accurately graded.

In some alternative implementations of the present embodiment, the method for selecting a sample corpus used to optimize the translation model further includes: acquiring multiple sample corpuses and sorting the sample corpuses in an order from low to high of the difficulty level to acquire a sample corpus sequence; and sequentially selecting the sample corpuses to perform optimization and training of the to-be-optimized translation model according to a sorting order indicated by the sample corpus sequence.

Specifically, when a plurality of first corpuses each with a difficulty level satisfying the requirements of the difficulty level threshold are determined as sample corpuses, the sample corpus sequence may be acquired by sorting the sample corpuses according to the difficulty levels from low to high. The sample corpus sequence indicates a sorting order of the sample corpuses according to the difficulty level from low to high, and the sample corpuses are selected to perform optimization and training of the to-be-optimized translation model according to the sorting order indicated by the sample corpus sequence, so as to realize iterative training according to training difficulty levels from low to high, and improve the optimization effect of the to-be-optimized translation model.

In some alternative implementations of the present embodiment, the method further includes: acquiring a reference similarity between a second standard corpus that is configured in advance and the second corpus, wherein the second standard corpus is a standard translation result corresponding to the first corpus and in the language type of the second corpus; and adding optimization indication information for indicating an optimization target to the sample corpus in response to the reference similarity being higher than a reference similarity threshold, where the optimization indication information is configured to indicate to perform the optimization of the to-be-optimized translation model according to an optimization direction from a language type of the second corpus to a language type of the third corpus.

Specifically, the reference similarity of the pre-configured second standard corpus and the second corpus is acquired. In response to the reference similarity being higher than the reference similarity threshold, it is determined that the translation and processing ability of the to-be-optimized translation model based on the language types of the second corpus is weak, and the optimization indication information to indicate the optimization direction for converting the language type of the second corpus to the language type of the third corpus is added to the sample corpus, thus optimizing the to- be-optimized translation model accordingly.

FIG. 3 illustrates a flowchart of another method for selecting a sample corpus used to optimize a translation model according to an embodiment of the present disclosure, where a flow 300 includes the followings steps.

Step 301: acquiring a first corpus, and translating the first corpus by using a to-be-optimized translation model to generate a second corpus corresponding to the first corpus.

Step 302: translating the second corpus by using the to-be-optimized translation model to generate a third corpus corresponding to the second corpus.

Step 303: determining a difficulty level of the first corpus based on a similarity between the first corpus and the third corpus.

Step 304: acquiring a reference similarity between a second standard corpus that is configured in advance and the second corpus in response to the difficulty level failing to satisfy the requirements of the difficulty level threshold.

In the present embodiment, after acquiring the second standard corpus that is configured in advance and corresponds to the first corpus in response to the difficulty level failing to satisfy requirements of the difficulty level threshold, the reference similarity between the second corpus and the second standard corpus is acquired. For an approach of acquiring the reference similarity between the second corpus and the second standard corpus, reference can be made to the approach of determining the similarity between the first corpus and the third corpus when the first corpus and the third corpus belong to the same language type in the corresponding embodiment of FIG. 2, which are not described herein.

It is also possible to generate a corresponding second standard corpus acquisition request when it is determined that the difficulty level of the first corpus fails to satisfy requirements of the difficulty level threshold without, configuring the second standard corpus in advance, so as to request the trainer of the to-be-optimized translation model to configure the corresponding second standard corpus to achieve a processing effect similar to a case in which the second standard corpus is configured in advance.

Step 305: adjusting the difficulty level of the first corpus to a first difficulty level satisfying the requirements of the difficulty level threshold in response to the reference similarity being lower than a first similarity threshold.

In the present embodiment, in response to the reference similarity acquired in step 304 being lower than the first similarity threshold, the difficulty level of the first corpus is adjusted to be equal to the difficulty level of the difficulty level threshold or to be higher than the difficulty level of the difficulty level threshold.

Step 306: determining the first corpus as a sample corpus in response to the difficulty level satisfying the requirements of the difficulty level threshold.

The above steps 301-303 and 306 are consistent with the step 201-204 shown in FIG. 2. For the contents of the same parts, refer to the corresponding parts of the previous embodiment, details of which are not described herein again.

On the basis of the embodiment shown in FIG. 2, a translation logic of the to-be-optimized translation model may be checked by using the reference similarity between the second standard corpus and the second corpus, so as to reduce problems of incorrectly determining difficulty levels caused by shortcut learning of the to-be-optimized translation model.

In some alternative implementations of the present embodiment, the difficulty level of the first corpus is adjusted to a second difficulty level higher than the first difficulty level in response to the reference similarity being lower than the second similarity threshold, where a value of the second similarity threshold is lower than the first similarity threshold.

Specifically, on the basis of the embodiment shown in FIG. 3, the second similarity threshold lower than the first similarity threshold may be further set so as to adjust the difficulty level of the first corpus to the second difficulty level higher than the first difficulty level when the difficulty level of the first corpus does not satisfy the level threshold requirements and the reference similarity is lower than the second similarity threshold value, thereby further resisting the incorrectly determining of the difficulty levels caused by shortcut learning or the like of the to-be-optimized translation model, and improving the quality of the determined sample corpus.

Figure 4:
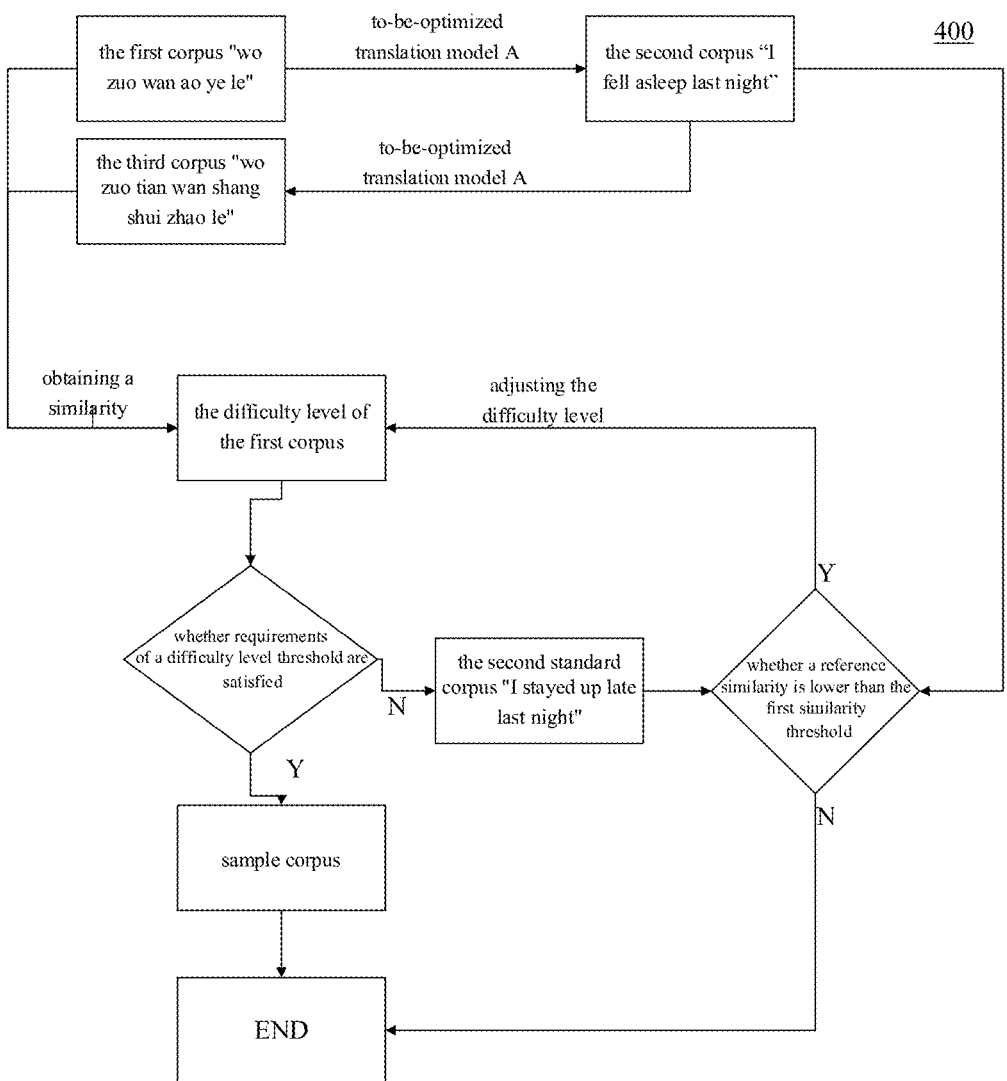
FIG. 4 is a schematic flowchart of a method for selecting a sample corpus used to optimize a translation model in an application scenario according to an embodiment of the present disclosure.

For further understanding, the present disclosure also provides a specific implementation scheme in conjunction with a specific application scenario. Referring to the flowchart 400 shown in FIG. 4, in this application scenario, it is determined whether the first corpus "wo zuo wan ao ye le" may be used as a sample corpus for training the translation model A.

After acquiring the first corpus "wo zuo wan ao ye le", the first corpus is processed by using a to-be-optimized translation model A to obtain a second corpus "I fell asleep last night" corresponding to the first corpus.

The second corpus "I fell asleep last night" is processed by using the to-be-optimized translation model A to obtain a third corpus "wo zuo tian wan shang shui zhao le" corresponding to the second corpus.

The difficulty levels are configured in an order from high to low. The threshold intervals of similarity for the difficulty levels are: difficult (similarity being less than), common (similarity being greater than or equal to 30% and less than or equal to 70%) and simple (similarity being greater than 70%). The requirement of the difficulty level threshold is the difficulty level is greater than or equal to "common". After acquiring a similarity (20%) between the first corpus "wo zuo wan ao ye le" and the third corpus "wo zuo tian wan shang shui zhao le", the difficulty level of the first corpus was determined as "difficult" based on the threshold interval of the similarity.

After the difficulty level of the first corpus is determined to be "difficult", the first corpus is determined to be a sample corpus for optimizing the to-be-optimized translation model in response to the difficulty level of "difficult" being higher than the difficulty level of "common".

In addition, to better describe the technical solution provided in the present disclosure, it may also be seen from the flowchart 400 that if the similarity between the first corpus "wo zuo wan ao ye le" and the third corpus "wo zuo tian wan shang shui zhao le" is 80%, that is, if the difficulty level of the first corpus is determined to be "simple" based on the threshold interval of the similarity, the second standard corpus "I stayed up late last night" may be acquired. Based on whether a reference similarity between the second standard corpus "I stayed up late last night" and the second corpus "I fell asleep last night" is lower than the first similarity threshold, the difficulty level of the first corpus needs to be adjusted.

Figure 5:
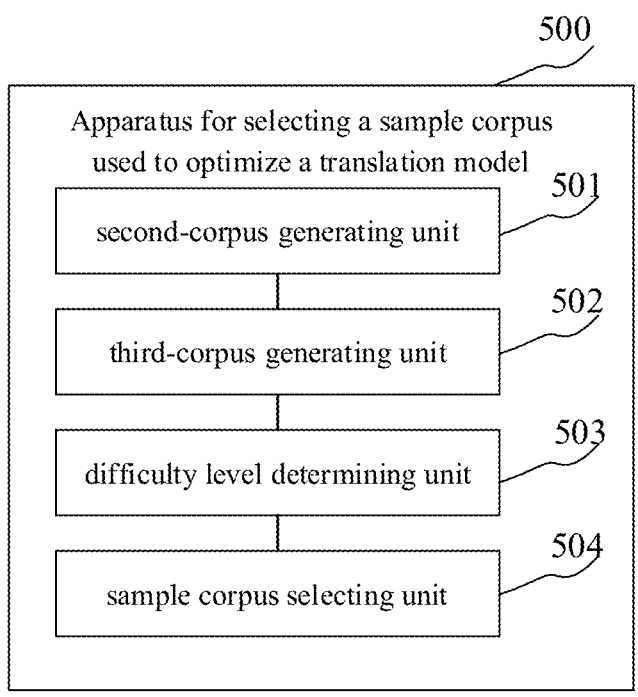
FIG. 5 is a structural block diagram of an apparatus for selecting a sample corpus used to optimize a translation model according to an embodiment of the present disclosure.

Further referring to FIG. 5, as an implementation of the method shown in each of the above figures, the present disclosure provides an embodiment of an apparatus for selecting a sample corpus used to optimize a translation model, which corresponds to the method embodiment shown in FIG. 2, and which is particularly applicable to various electronic devices.

As shown in FIG. 5, the apparatus 500 for selecting a sample corpus used to optimize a translation model in the present embodiment may include a second-corpus generating unit 501, a third-corpus generating unit 502, a difficulty level determining unit 503, and a sample corpus selecting unit 504. The second corpus generating unit 501 is configured to acquire a first corpus, and translate the first corpus by using a to-be-optimized translation model to generate a second corpus corresponding to the first corpus, wherein a language type of the first corpus and a language type of the second corpus are different, and the to-be-optimized translation model are configured to perform bidirectional translation between the language type of the first corpus and the language type of the second corpus. The third corpus generating unit 502 is configured to translate the second corpus by using the to-be-optimized translation model to generate a third corpus corresponding to the second corpus, wherein a language type of the third corpus and the language type of the first corpus are the same. The difficulty level determining unit 503 is configured to determine a difficulty level of the first corpus based on a similarity between the first corpus and the third corpus, wherein the difficulty level includes at least two levels. The sample corpus selecting unit 504 is configured to determine the first corpus as a sample corpus in response to the difficulty level satisfying requirements of a difficulty level threshold, wherein the sample corpus is configured to optimize the to-be-optimized translation model.

In the present embodiment, in the apparatus 500 for selecting a sample corpus used to optimize a translation model, the specific processing of the second-corpus generating unit 501, the third-corpus generating unit 502, the difficulty level determining unit 503, and the sample corpus selecting unit 504 and the technical effects thereof may be described with reference to the related description of step 201-204 in the corresponding embodiment in FIG. 2, and details of which are not described herein again.

In some alternative implementations of the present embodiment, the apparatus 500 for selecting a sample corpus used to optimize a translation model further includes a reference similarity acquiring unit configured to acquire a reference similarity between a second standard corpus that is configured in advance and the second corpus in response to the difficulty level failing to satisfy the requirements of the difficulty level threshold, wherein the second standard corpus is a standard translation result corresponding to the first corpus under the language type of the second corpus; and a first difficulty adjusting unit configured to adjust the difficulty level of the first corpus to a first difficulty level satisfying the requirements of the difficulty level threshold in response to the reference similarity being lower than a first similarity threshold.

In some alternative implementations of the present embodiment, the apparatus 500 for selecting a sample corpus used to optimize a translation model further includes a second difficulty adjusting unit configured to adjust the difficulty level of the first corpus to a second difficulty level higher than the first difficulty level in response to the reference similarity being lower than a second similarity threshold, wherein a value of the second similarity threshold is lower than a value of the first similarity threshold.

In some alternative implementations of the present embodiment, the apparatus 500 for selecting a sample corpus used to optimize a translation model further includes a reference similarity acquiring unit configured to acquire a reference similarity between a second standard corpus that is configured in advance and the second corpus, wherein the second standard corpus is a standard translation result corresponding to the first corpus under the language type of the second corpus; and an optimization indication information adding unit configured to add optimization indication information for indicating an optimization target to the sample corpus in response to the reference similarity being higher than a reference similarity threshold, wherein the optimization indication information is configured to indicate to perform optimization of the to-be-optimized translation model according to an optimization direction from a language type of the second corpus to a language type of the third corpus.

In some alternative implementations of the present embodiment, the difficulty level determining unit 503 includes a similarity comparing sub-unit configured to acquire a similarity between the first corpus and the third corpus; and a difficulty level determining sub-unit configured to the difficulty level of the first corpus according to a threshold interval in which the similarity falls.

In some alternative implementations of the present embodiment, the apparatus 500 for selecting a sample corpus used to optimize a translation model further includes a sequence generating unit configured to sorting sample corpuses according to an order from low to high of the difficulty levels of the sample corpuses to acquire a sample corpus sequence; and a model optimization training unit configured to sequentially select the sample corpuses to perform optimization and training on the to-be-optimized translation model according to a sorting order indicated by the sample corpus sequence.

The present embodiment is a device embodiment corresponding to the above-described method embodiment. The apparatus for selecting a sample corpus used to optimize a translation model may determine An identification and processing ability of the to-be-optimized translation model for the first corpus through a bidirectional processing result of the to-be-optimized translation model for the first corpus, so that after the processing difficulty of the first corpus for the to-be-optimized translation model is determined, a sample corpus with an actual optimization effect on the current model effect is selected, and the problem of misjudging the difficulty levels of sample corpuses caused by error-tagging in the first corpus may be solved.

According to an embodiment of the present disclosure, the present disclosure also provides an electronic device, a readable storage medium, and a computer program product.

Figure 6:
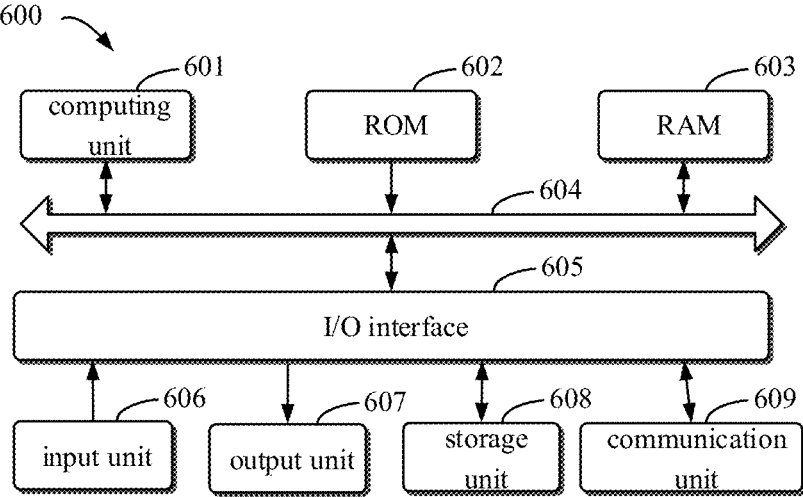
FIG. 6 is a schematic structural diagram of an electronic device adapted to implement a method for selecting a sample corpus used to optimize a translation model according to an embodiment of the present disclosure.

FIG. 6 is a schematic block diagram of an example electronic device 600 that may be adapted to implement the embodiments of the present disclosure. The electronic device is intended to represent various forms of digital computers such as a laptop computer, a desktop computer, a workstation, a personal digital assistant, a server, a blade server, a mainframe computer, and other appropriate computers. The electronic device may alternatively represent various forms of mobile apparatuses such as personal digital assistant, a cellular telephone, a smart phone, a wearable device and other similar computing apparatuses. The parts shown herein, their connections and relationships, and their functions are only as examples, and not intended to limit implementations of the present disclosure as described and/or claimed herein.

As shown in FIG. 6, the device 600 includes a computing unit 601, which can perform various appropriate actions and processes according to a computer program stored in a read only memory (ROM) 602 or a computer program loaded from the storage unit 608 into a random access memory (RAM) 603. In RAM 603, various programs and data required for the operation of device 600 can also be stored. The computing unit 601, ROM 602, and RAM 603 are connected to each other through a bus 604. Input/output (I/O) interface 605 is also connected to bus 604.

A plurality of components in the device 600 are connected to the I/O interface 605, including: an input unit 606, such as a keyboard, a mouse, etc.; an output unit 607, such as various types of displays, speakers, and the like; a storage unit 608, such as a magnetic disk, an optical disk, and the like; and a communication unit 609, such as a network card, a modem, a wireless communication transceiver, and the like. The communication unit 609 allows the device 600 to exchange information/data with other devices through computer networks such as the Internet and/or various telecommunication networks.

The computing unit 601 may be various general-purpose and/or special-purpose processing components with processing and computing capabilities. Some examples of the computing unit 601 include, but are not limited to, a central processing unit (CPU), a graphics processing unit (GPU), various dedicated artificial intelligence (AI) computing chips, various computing units that run machine learning model algorithms, digital signal processors (DSPS), and any appropriate processors, controllers, microcontrollers, and the like. The calculation unit 601 performs the various methods and processes described above, such as a method for training a video recognition model. For example, in some embodiments, the method for training a video recognition model may be implemented as a computer software program that is tangibly contained in a machine-readable medium, such as a storage unit 608. In some embodiments, part or all of the computer program may be loaded and/or installed on the device 600 via ROM 602 and/or communication unit 609. When the computer program is loaded into RAM 603 and executed by the computing unit 601, one or more steps of the method for training a video recognition model described above may be performed. Alternatively, in other embodiments, the computing unit 601 may be configured to perform the method for training a video recognition model by any other suitable means (e.g., by means of firmware).

Various embodiments of the systems and technologies described above in this paper can be implemented in digital electronic circuit systems, integrated circuit systems, field programmable gate arrays (FPGAs), application specific integrated circuits (ASIC), application specific standard products (ASSP), system on chip (SOC), load programmable logic devices (CPLD), computer hardware, firmware, software, and/or combinations thereof. These various embodiments may include: being implemented in one or more computer programs, the one or more computer programs can be executed and/or interpreted on a programmable system including at least one programmable processor, which can be a special-purpose or general-purpose programmable processor, and can receive data and instructions from the storage system, at least one input device, and at least one output device, and transmitting data and instructions to the storage system, the at least one input device, and the at least one output device.

The program code for implementing the methods of the present disclosure may be written in any combination of one or more programming languages. These program codes can be provided to the processor or controller of general-purpose computer, special-purpose computer or other programmable data processing device, so that when the program code is executed by the processor or controller, the functions/operations specified in the flow chart and/or block diagram are implemented. The program code can be completely executed on the machine, partially executed on the machine, partially executed on the machine and partially executed on the remote machine as a separate software package, or completely executed on the remote machine or server.

In the context of the present disclosure, a machine-readable medium may be a tangible medium that may contain or store a program for use by or in combination with an instruction execution system, apparatus, or device. The machine-readable medium can be a machine-readable signal medium or a machine-readable storage medium. Machine readable media may include, but are not limited to, electronic, magnetic, optical, electromagnetic, infrared, or semiconductor systems, apparatuses, or devices, or any suitable combination of the foregoing. More specific examples of machine-readable storage media may include one or more wire based electrical connections, portable computer disks, hard disks, random access memory (RAM), read only memory (ROM), erasable programmable read only memory (EPROM or flash memory), optical fibers, compact disk read only memory (CD-ROM), optical storage devices, magnetic storage devices, or any suitable combination of the above.

In order to provide interaction with users, the systems and techniques described herein can be implemented on a computer with: a display device for displaying information to users (for example, a CRT (cathode ray tube) or LCD (liquid crystal display) monitor); and a keyboard and a pointing device (e.g., a mouse or a trackball) through which the user can provide input to the computer. Other kinds of devices can also be used to provide interaction with users. For example, the feedback provided to the user may be any form of sensor feedback (e.g., visual feedback, auditory feedback, or tactile feedback); and the input from the user can be received in any form (including acoustic input, voice input or tactile input).

The systems and techniques described herein may be implemented in a computing system including background components (e.g., as a data server), or a computing system including middleware components (e.g., an application server) or a computing system including a front-end component (e.g., a user computer with a graphical user interface or a web browser through which a user can interact with embodiments of the systems and techniques described herein), or a computing system including any combination of the back-end component, the middleware component, the front-end component. The components of the system can be interconnected by digital data communication (e.g., communication network) in any form or medium. Examples of communication networks include local area networks (LANs), wide area networks (WANs), and the Internet.

A computer system may include a client and a server. The client and the server are generally far away from each other and usually interact through communication networks. The relationship between the client and the server is generated by computer programs running on the corresponding computers and having a client server relationship with each other. The server can be a cloud server, a distributed system server, or a blockchain server.

According to the technical scheme of the embodiments of the present disclosure, an identification and processing ability of the to-be-optimized translation model for the first corpus may be determined through a bidirectional processing result of the to-be-optimized translation model for the first corpus, so that after the processing difficulty of the first corpus for the to-be-optimized translation model is determined, a sample corpus with an actual optimization effect on the current model effect is selected, and the problem of misjudging the difficulty levels of sample corpuses caused by error-tagging in the first corpus may be solved.

It should be understood that various forms of processes shown above can be used to reorder, add or delete steps. For example, the steps recorded in the present disclosure can be performed in parallel, in sequence, or in different orders, as long as the desired results of the technical solution of the present disclosure can be achieved, which is not limited herein.

The above specific embodiments do not constitute restrictions on the scope of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A method for selecting a sample corpus used to optimize a translation model, comprising:

step i): acquiring a first corpus, and translating the first corpus by using a to-be-optimized translation model to generate a second corpus corresponding to the first corpus, wherein a language type of the first corpus and a language type of the second corpus are different, and the to-be-optimized translation model is configured to perform bidirectional translation between the language type of the first corpus and the language type of the second corpus;

step ii): translating the second corpus by using the to-be-optimized translation model to generate a third corpus corresponding to the second corpus, wherein a language type of the third corpus and the language type of the first corpus are the same;

step iii): determining a difficulty level of the first corpus based on a similarity between the first corpus and the third corpus, wherein the difficulty level comprises at least two levels;

step iv): determining the first corpus as a sample corpus in response to the difficulty level satisfying requirements of a difficulty level threshold, wherein the sample corpus is configured to optimize the to-be-optimized translation model;

step v): acquiring a plurality of sample corpuses each being determined by steps i) to iv);

step vi): sorting the plurality of sample corpuses from low to high according to difficulty levels of the sample corpuses to acquire a sample corpus sequence; and step vii): training the to-be-optimized translation model according to a sorting order indicated by the sample corpus sequence, wherein the training comprises: sequentially selecting, according to the sorting order, the sample corpuses as inputs of the to-be-optimized translation model.

2. The method according to claim 1, further comprising:
acquiring a reference similarity between a second standard corpus that is configured in advance and the second corpus in response to the difficulty level failing to satisfy the requirements of the difficulty level threshold, wherein the second standard corpus is a standard translation result corresponding to the first corpus under the language type of the second corpus; and
adjusting the difficulty level of the first corpus to a first difficulty level satisfying the requirements of the difficulty level threshold in response to the reference similarity being lower than a first similarity threshold.

3. The method according to claim 2, further comprising:
adjusting the difficulty level of the first corpus to a second difficulty level higher than the first difficulty level in response to the reference similarity being lower than a second similarity threshold, wherein a value of the second similarity threshold is lower than a value of the first similarity threshold.

4. The method according to claim 1, further comprising:
acquiring a reference similarity between a second standard corpus that is configured in advance and the second corpus, wherein the second standard corpus is a standard translation result corresponding to the first corpus under the language type of the second corpus; and
adding optimization indication information for indicating an optimization target to the sample corpus in response to the reference similarity being higher than a reference similarity threshold, wherein the optimization indication information is configured to indicate to perform optimization of the to-be-optimized translation model according to an optimization direction from a language type of the second corpus to a language type of the third corpus.

5. The method according to claim 1, wherein determining the difficulty level of the first corpus based on the similarity between the first corpus and the third corpus comprises:
acquiring a similarity between the first corpus and the third corpus; and
determining the difficulty level of the first corpus according to a threshold interval in which the similarity falls.

6. An apparatus for selecting a sample corpus used to optimize a translation model, comprising:
at least one processor; and
a memory storing instructions, wherein the instructions when executed by the at least one processor, cause the at least one processor to perform operations, the operations comprising:
step i): acquiring a first corpus, and translating the first corpus by using a to-be-optimized translation model to generate a second corpus corresponding to the first corpus, wherein a language type of the first corpus and a language type of the second corpus are different, and the to-be-optimized translation model is configured to perform bidirectional translation between the language type of the first corpus and the language type of the second corpus;
step ii): translating the second corpus by using the to-be-optimized translation model to generate a third corpus corresponding to the second corpus, wherein a language type of the third corpus and the language type of the first corpus are the same;
step iii); determining a difficulty level of the first corpus based on a similarity between the first corpus and the third corpus, wherein the difficulty level comprises at least two levels;

step iv): determining the first corpus as a sample corpus in response to the difficulty level satisfying requirements of a difficulty level threshold, wherein the sample corpus is configured to optimize the to-be-optimized translation model;
step v): acquiring a plurality of sample corpuses each being determined by steps i) to iv);
step vi): sorting the plurality of sample corpuses from low to high according to difficulty levels of the sample corpuses to acquire a sample corpus sequence; and
step vii): training the to-be-optimized translation model according to a sorting order indicated by the sample corpus sequence, wherein the training comprises: sequentially selecting, according to the sorting order, the sample corpuses as inputs of the to-be-optimized translation model.

7. The apparatus according to claim 6, the operations further comprising:
acquiring a reference similarity between a second standard corpus that is configured in advance and the second corpus in response to the difficulty level failing to satisfy the requirements of the difficulty level threshold, wherein the second standard corpus is a standard translation result corresponding to the first corpus under the language type of the second corpus; and
adjusting the difficulty level of the first corpus to a first difficulty level satisfying the requirements of the difficulty level threshold in response to the reference similarity being lower than a first similarity threshold.

8. The apparatus according to claim 7, the operations further comprising:
adjusting the difficulty level of the first corpus to a second difficulty level higher than the first difficulty level in response to the reference similarity being lower than a second similarity threshold, wherein a value of the second similarity threshold is lower than a value of the first similarity threshold.

9. The apparatus according to claim 6, the operations further comprising:
acquiring a reference similarity between a second standard corpus that is configured in advance and the second corpus, wherein the second standard corpus is a standard translation result corresponding to the first corpus under the language type of the second corpus; and
adding optimization indication information for indicating an optimization target to the sample corpus in response to the reference similarity being higher than a reference similarity threshold, wherein the optimization indication information is configured to indicate to perform optimization of the to-be-optimized translation model according to an optimization direction from a language type of the second corpus to a language type of the third corpus.

10. The apparatus according to claim 6, wherein determining the difficulty level of the first corpus based on the similarity between the first corpus and the third corpus comprises:
acquiring a similarity between the first corpus and the third corpus; and
determining the difficulty level of the first corpus according to a threshold interval in which the similarity falls.

11. A non-transitory computer readable storage medium, storing a computer instruction, wherein the computer instruction when executed by a computer causes the computer to perform operations comprising:

step i): acquiring a first corpus, and translating the first corpus by using a to-be-optimized translation model to generate a second corpus corresponding to the first corpus, wherein a language type of the first corpus and a language type of the second corpus are different, and the to-be-optimized translation model is configured to perform bidirectional translation between the language type of the first corpus and the language type of the second corpus;

step ii): translating the second corpus by using the to-be-optimized translation model to generate a third corpus corresponding to the second corpus, wherein a language type of the third corpus and the language type of the first corpus are the same;

step iii); determining a difficulty level of the first corpus based on a similarity between the first corpus and the third corpus, wherein the difficulty level comprises at least two levels;

step iv): determining the first corpus as a sample corpus in response to the difficulty level satisfying requirements of a difficulty level threshold, wherein the sample corpus is configured to optimize the to-be-optimized translation model;

step v): acquiring a plurality of sample corpuses each being determined by steps i) to iv);

step vi): sorting the plurality of sample corpuses from low to high according to difficulty levels of the sample corpuses to acquire a sample corpus sequence; and step vii): training the to-be-optimized translation model according to a sorting order indicated by the sample corpus sequence, wherein the training comprises: sequentially selecting, according to the sorting order, the sample corpuses as inputs of the to-be-optimized translation model.

12. The non-transitory computer readable storage medium according to claim 11, the operations further comprising:

acquiring a reference similarity between a second standard corpus that is configured in advance and the second corpus in response to the difficulty level failing to satisfy the requirements of the difficulty level threshold, wherein the second standard corpus is a standard translation result corresponding to the first corpus under the language type of the second corpus; and adjusting the difficulty level of the first corpus to a first difficulty level satisfying the requirements of the difficulty level threshold in response to the reference similarity being lower than a first similarity threshold.

13. The non-transitory computer readable storage medium according to claim 12, the operations further comprising:

adjusting the difficulty level of the first corpus to a second difficulty level higher than the first difficulty level in response to the reference similarity being lower than a second similarity threshold, wherein a value of the second similarity threshold is lower than a value of the first similarity threshold.

14. The non-transitory computer readable storage medium according to claim 11, the operations further comprising:

acquiring a reference similarity between a second standard corpus that is configured in advance and the second corpus, wherein the second standard corpus is a standard translation result corresponding to the first corpus under the language type of the second corpus; and adding optimization indication information for indicating an optimization target to the sample corpus in response to the reference similarity being higher than a reference similarity threshold, wherein the optimization indication information is configured to indicate to perform optimization of the to-be-optimized translation model according to an optimization direction from a language type of the second corpus to a language type of the third corpus.

15. The non-transitory computer readable storage medium according to claim 11, wherein determining the difficulty level of the first corpus based on the similarity between the first corpus and the third corpus comprises:

acquiring a similarity between the first corpus and the third corpus; and determining the difficulty level of the first corpus according to a threshold interval in which the similarity falls.

* * * * *